US007896308B2

(12) United States Patent
Yoshikawa et al.

(10) Patent No.: US 7,896,308 B2
(45) Date of Patent: Mar. 1, 2011

(54) MOUNTING STRUCTURE AND METHOD FOR HEAT ACCUMULATION TANK

(75) Inventors: Shigetaka Yoshikawa, Nishikamo-gun (JP); Yoshikazu Shinpo, Nissin (JP); Katuhiko Arisawa, Nishikamo-gun (JP); Isao Goto, Toyota (JP); Masaaki Iinuma, Nishikamo-gun (JP); Toshio Morikawa, Toyota (JP); Takashi Toyoshima, Oobu (JP); Yoshio Miyata, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1828 days.

(21) Appl. No.: 10/811,984

(22) Filed: Mar. 30, 2004

(65) Prior Publication Data

US 2004/0226687 A1 Nov. 18, 2004

(30) Foreign Application Priority Data

Mar. 31, 2003 (JP) ............................ 2003-093015

(51) Int. Cl.
*F16M 1/00* (2006.01)

(52) U.S. Cl. ......................... 248/637; 248/315; 237/44; 169/51

(58) Field of Classification Search ................. 248/313, 248/314, 551, 316.1, 316.2, 309.1, 311.2, 248/315; 237/44, 75; 180/68.4, 68.6; 169/51
See application file for complete search history.

(56) References Cited

U.S. PATENT DOCUMENTS 354,705 A * 12/1886 Kenderdine ................. 81/3.32
451,097 A * 4/1891 Wilkinson ................... 211/74
547,713 A * 10/1895 Courtenay .................. 215/395
901,618 A * 10/1908 Honstein .................... 81/3.32
1,007,062 A * 10/1911 Calson ....................... 248/313
1,017,102 A * 2/1912 Kaufman .................... 248/313
1,226,968 A * 5/1917 Guenther .................... 248/551
1,238,943 A * 9/1917 Roberts et al. .............. 165/149

(Continued)

FOREIGN PATENT DOCUMENTS

DE 1 987 450 U 6/1971

(Continued)

OTHER PUBLICATIONS

European Language Version of European Office Action, Appln. No. 04 007 659.8 issued Jun. 11, 2007.

(Continued)

*Primary Examiner*—Kimberly T Wood
(74) *Attorney, Agent, or Firm*—Kenyon & Kenyon LLP

(57) ABSTRACT

A mounting structure for a heat accumulation tank is provided with an elastic member that wraps around a tank main body, and a heat accumulation tank mounting member which wraps around the outer peripheral surface of the elastic member and holds the tank main body by being tightened in the circumferential direction, and which attaches to a receiving member. The elastic member is a molded part. The length of the elastic member is shorter than length of the circumference of the outer peripheral surface of the tank main body. The heat accumulation tank mounting member includes a shift inhibiting portion which inhibits an upward shift of the tank main body. The outside diameter of the tank main body becomes increasingly wider in the upward direction.

9 Claims, 7 Drawing Sheets

U.S. PATENT DOCUMENTS

| | | | | | |
|---|---|---|---|---|---|
| 1,288,839 | A | * | 12/1918 | Conrad et al. | 248/313 |
| 1,311,628 | A | * | 7/1919 | Walsh | 248/315 |
| 1,337,234 | A | * | 4/1920 | Kopf | 248/551 |
| 1,347,611 | A | * | 7/1920 | Blenko | 248/292.11 |
| 1,427,375 | A | * | 8/1922 | Gove | 248/313 |
| 1,430,525 | A | * | 9/1922 | Webber | 248/552 |
| 1,487,674 | A | * | 3/1924 | Starbird | 248/313 |
| 1,578,134 | A | * | 3/1926 | Kaiser | 81/3.32 |
| 1,788,464 | A | * | 1/1931 | Kederis et al. | 248/224.51 |
| 1,806,560 | A | * | 5/1931 | McKinley | 248/313 |
| 1,816,892 | A | * | 8/1931 | Bronander | 169/30 |
| 1,834,511 | A | * | 12/1931 | Andrake | 248/201 |
| 1,858,144 | A | * | 5/1932 | Fariello | 81/3.32 |
| 1,867,892 | A | * | 7/1932 | Rice | 248/154 |
| 1,929,334 | A | * | 10/1933 | Sabatine | 81/3.32 |
| 2,341,888 | A | * | 2/1944 | White | 210/441 |
| 2,554,120 | A | * | 5/1951 | Pisano | 248/238 |
| 2,845,184 | A | * | 7/1958 | Hayden et al. | 211/119.006 |
| 2,987,585 | A | * | 6/1961 | Abysalh | 379/455 |
| 3,176,949 | A | * | 4/1965 | Moulton | 248/147 |
| 3,227,410 | A | * | 1/1966 | McCuen | 248/201 |
| 3,765,635 | A | * | 10/1973 | Burrell et al. | 248/313 |
| 3,765,636 | A | * | 10/1973 | Burrell et al. | 248/313 |
| 3,836,182 | A | * | 9/1974 | Miller | 285/114 |
| 3,856,245 | A | | 12/1974 | Byerly | |
| 3,904,041 | A | * | 9/1975 | Medgebow | 211/72 |
| 4,154,367 | A | * | 5/1979 | Hanson et al. | 222/130 |
| 4,360,802 | A | * | 11/1982 | Pinto | 340/568.8 |
| 4,491,763 | A | * | 1/1985 | Fujinuma et al. | 313/405 |
| 4,754,941 | A | * | 7/1988 | Weiss | 248/74.3 |
| 4,786,999 | A | * | 11/1988 | Tanaka et al. | 360/245.2 |
| 4,834,186 | A | * | 5/1989 | Ballard | 169/16 |
| 4,871,597 | A | | 10/1989 | Hobson | |
| 4,955,573 | A | * | 9/1990 | Horvath | 248/313 |
| 5,094,363 | A | | 3/1992 | Monahan | |
| 5,121,848 | A | * | 6/1992 | Waligorski | 220/755 |
| 5,662,072 | A | | 9/1997 | Suzuki et al. | |
| 6,041,618 | A | * | 3/2000 | Patel et al. | 62/503 |
| 6,994,058 | B2 | * | 2/2006 | Iinuma et al. | 123/41.14 |
| 6,994,268 | B2 | * | 2/2006 | Maruyama et al. | 237/44 |
| 2004/0188533 | A1 | * | 9/2004 | Ito et al. | 237/44 |
| 2008/0078911 | A1 | * | 4/2008 | Ziaylek | 248/313 |
| 2009/0011275 | A1 | * | 1/2009 | Nishimura et al. | 428/639 |

FOREIGN PATENT DOCUMENTS

| | | | |
|---|---|---|---|
| EP | 0 338 246 | A | 3/1989 |
| GB | 574424 | | 1/1946 |
| GB | 682480 | | 11/1952 |
| JP | 06-213116 | A | 8/1994 |
| JP | 10-086644 | A | 4/1998 |
| JP | 2000-073764 | A | 3/2000 |
| JP | 2002-188442 | A | 7/2002 |

OTHER PUBLICATIONS

Japanese Language Translation of Japanese Office Communication, Appln. No. 2003-093015 issued Aug. 8, 2006.

English Translation of Examiner's Comments, Japanese Office Communication, Appln. No. 2003-093015 issued Aug. 8, 2006.

* cited by examiner

MOUNTING STRUCTURE AND METHOD FOR HEAT ACCUMULATION TANK

INCORPORATION BY REFERENCE

The disclosure of Japanese Patent Application No. 2003-093015 filed on Mar. 31, 2003, including the specification, drawings and abstract is incorporated herein by reference in its entirety.

BACKGROUND OF THE INVENTION

1. Field of the Invention

The invention relates to a mounting structure and method for mounting a heat accumulation tank to receiving member.

2. Description of the Related Art

JP-A-2002-188442 and JP-A-2000-73764 disclose proposals for a heat accumulation tank. This heat accumulation tank includes a tank main body which stores, while keeping warm, coolant for an internal combustion engine. The tank main body has an inner tank and an outer tank, with a space therebetween which is substantially a vacuum in order to improve heat retention. Also as related art, JP-A-10-86644 discloses a mounting structure for mounting a heat accumulation tank to a receiving member (such as a vehicle body member). More specifically, the publication discloses a mounting structure that fixedly supports a tank main body using a bracket that is attached to a receiving member.

However, the holding strength of the mounting structure for a heat accumulation tank described in JP-A-10-86644 is weak because only a portion of the heat accumulation tank is held in the circumferential direction. Further, it is difficult to apply the surface pressure evenly because the tank main body is directly supported by the bracket. This results in problems, such as that it makes the tank main body susceptible to damage. Also, if the bracket, which should reliably hold the tank main body, is spot welded to the outer tank of the tank main body, a slow leak may develop across the interface of the spot weld over an extended period of time. This slow leak reduces the degree of vacuum between the inner and outer tanks, which may result in a decrease in heat retaining performance.

SUMMARY OF THE INVENTION

In view of the foregoing problems, one aspect of this invention relates to a mounting structure for a heat accumulation tank described below. This mounting structure includes i) a tank main body which constitutes a heat accumulation tank, ii) an elastic member which wraps around substantially the entire periphery of the tank main body, and iii) a mounting member which wraps around substantially the entire periphery of an outer peripheral surface of the elastic member and which is attached to a receiving member.

Further, another aspect of the invention relates to a mounting method for a heat accumulation tank. This mounting method includes the steps of i) wrapping an elastic member around substantially the entire periphery of a tank main body, which constitutes a heat accumulation tank, and ii) wrapping a mounting member around substantially the entire periphery of an outer peripheral surface of the elastic member and attaching the mounting member to a receiving member.

According to the mounting structure and mounting method for a heat accumulation tank described above, the heat accumulation tank is able to be reliably held by the mounting member because the mounting member holds the tank main body around its entire periphery. Further, because the tank main body is held by the mounting member via the elastic member, the surface pressure is able to be applied evenly. Also, because the elastic member is provided between the mounting member and the tank main body, and the mounting member is not welded to the tank main body, a slow leak will not develop at the interface of the weld zone. As a result, the degree of vacuum in the space between the inner tank and outer tank can be maintained, thus enabling heat retention to be achieved over an extended period of time.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF THE EXEMPLARY EMBODIMENTS

In the following description and the accompanying drawings, the present invention will be described in more detail in terms of exemplary embodiments.

A heat accumulation tank 1 to which a mounting structure for a heat accumulation tank according to one exemplary embodiment of the invention can be applied will be described with reference to FIGS. 1 and 9.

Figure 1:
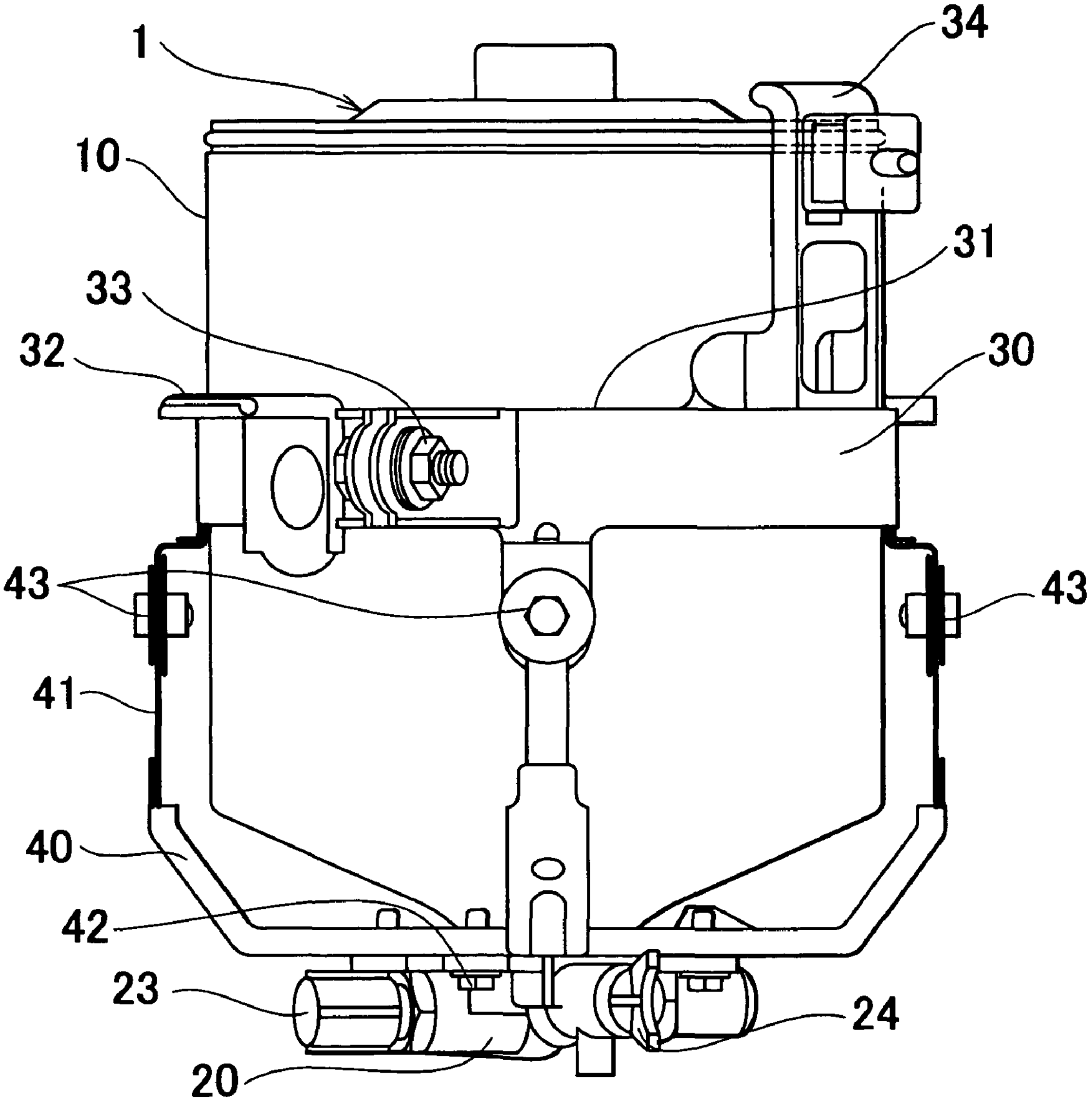
FIG. 1 is a full front view of a mounting structure of a heat accumulation tank and the heat accumulation tank according to one exemplary embodiment of this invention.
Figure 9:
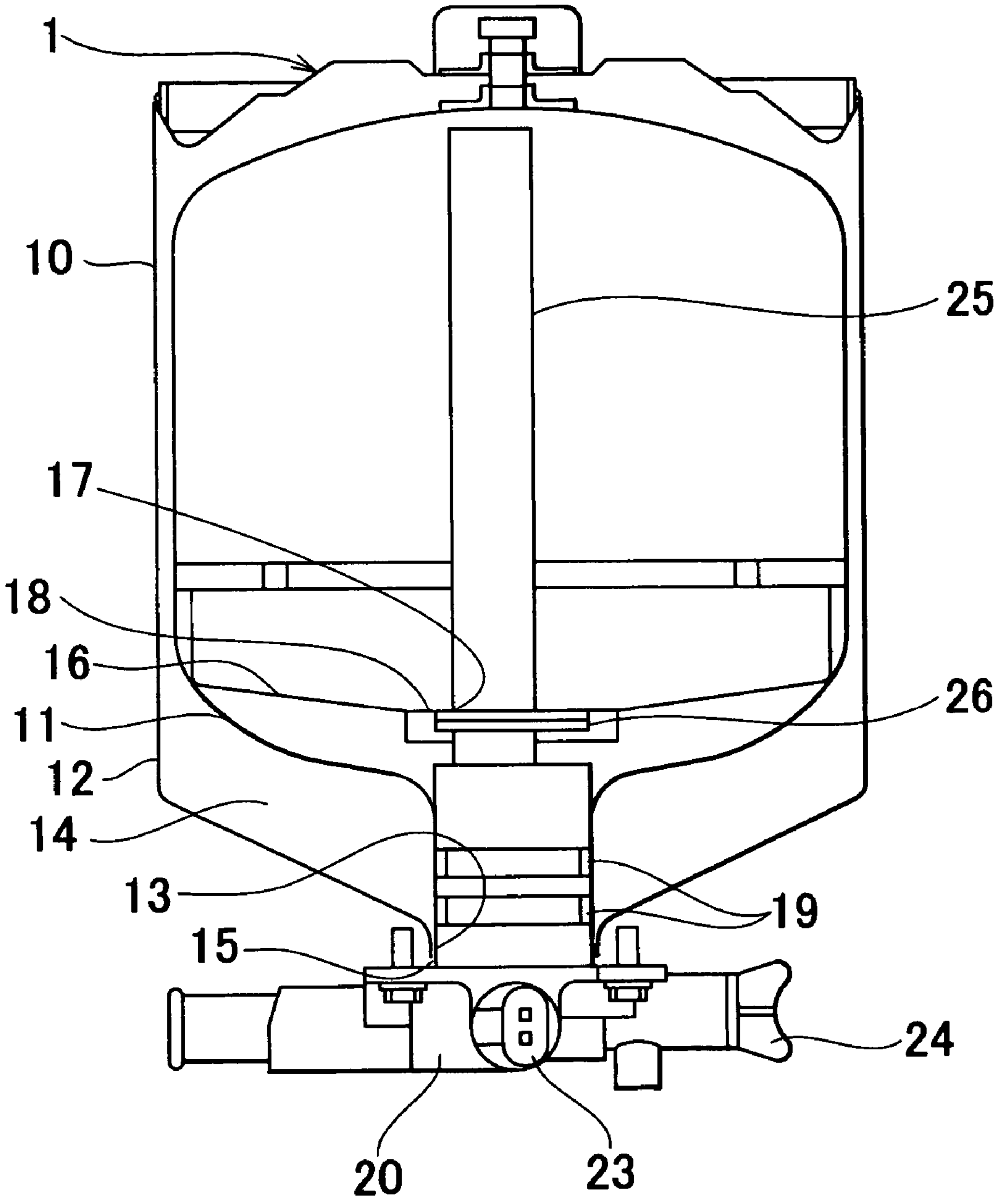
FIG. 9 is an overall sectional view of the heat accumulation tank to which the mounting structure according to the exemplary embodiment of the invention is applied.

As shown in FIGS. 1 and 9, the heat accumulation tank 1 has a tank main body 10 which stores fluid (coolant) while keeping it warm. The heat accumulation tank 1 also has a housing 20 in which is provided a fluid passage that opens into an inner portion of the tank main body 10, and through which fluid flows. The tank main body 10 has a tank main body opening 13 into which the housing 20 is inserted. The heat accumulation tank 1 has an axial core, and is mounted to a receiving member of a vehicle with an orientation such that the axial core is substantially vertically. In the example shown in the drawing, the heat accumulation tank 1 is mounted to the receiving member with the tank main body opening 13 facing downward. The invention, however, is not limited to this. For example, the heat accumulation tank 1 may alternatively be mounted to the receiving member with the tank main body opening 12 facing upward.

As shown in FIG. 9, the tank main body 10 is provided with an inner tank 11 and an outer tank 12. The inner tank 11 and outer tank 12 is made out of stainless steel, for example. The inner tank 11 and outer tank 12 are welded together at the lower end of the tank main body opening 13 (this weld zone where the inner tank 11 and outer tank 12 are welded together is denoted by the reference numeral 15). A sealed space 14 is formed between the inner tank 11 and the outer tank 12. This sealed space 14 is substantially a vacuum. Because of the insulation effect of this vacuum, the sealed space 14 keeps the warm coolant, which flows into the tank main body 10, warm. When this heat accumulation tank 1 is used in a cooling system of an internal combustion engine (i.e., engine), warm coolant flows through the fluid passage provided in the housing 20 and into the inner tank 11, where it is stored and kept warm. The stored coolant then flows out from the heat accumulation tank during, for example, preheating before staring the engine.

A rectifying member 16 (also referred to as a “mixture prevention plate”) is provided in the inner tank 11. This rectifying member 16 serves to uniformly rectify the flow of cold coolant that flows in during, for example, preheating before starting the engine. The rectified coolant is gradually discharged above the rectifying member and slowly rises. Therefore, the warm coolant above the rectifying member is inhibited from mixing with the cold coolant below all at once. A single pipe insertion hole 17 and a plurality of holes through which the coolant passes after it is uniformly rectified are provide in the rectifying member 16.

The housing 20 is inserted in the inner periphery side of the tank main body opening 13. The area between the tank main body opening 13 and the housing 20 is sealed by a seal (i.e., an O-ring) to prevent leakage. The housing 20 has a portion that is located on the outer portion of the tank main body 10. A temperature sensor 23 and a drain plug 24 are attached to this portion of the housing 20. The housing 20 is made of resin, for example. The weld zone 15 of the inner tank 11 and outer tank 12 at the tank main body opening 13 of the tank main body 10 is not enclosed from the outside by the housing 20 in the radial direction of the tank main body opening 13, but instead is open to the outside in that direction.

A pipe 25 is inserted into and fixed to the housing 20. One end of the pipe 25 is connected to the fluid passage of the housing 20. The other end of the pipe 25 opens to a space full of coolant inside the inner tank 11. The pipe 25 extends through the pipe insertion hole 17 in the rectifying member 16. Midway in the pipe 25 is provided a flange 26 that extends in the radial direction of the pipe 25. The flange 26 and a peripheral portion 18 of the pipe insertion hole 17 in the rectifying member 16 are not fixed to each other.

Next, the mounting structure of the heat accumulation tank 1 according to this exemplary embodiment of the invention will be described with reference to FIGS. 1 to 8. As shown in FIGS. 1 to 4, the heat accumulation tank 1 with the tank main body 10 is mounted to, and supported by, a receiving member (such as a vehicle body member) via a heat accumulation tank mounting member 30. This heat accumulation tank mounting member 30 is, for example, made of metal. Also, a housing support member 40 for holding the housing 20 to the tank main body 10 is attached to the heat accumulation tank mounting member 30.

Figure 4:
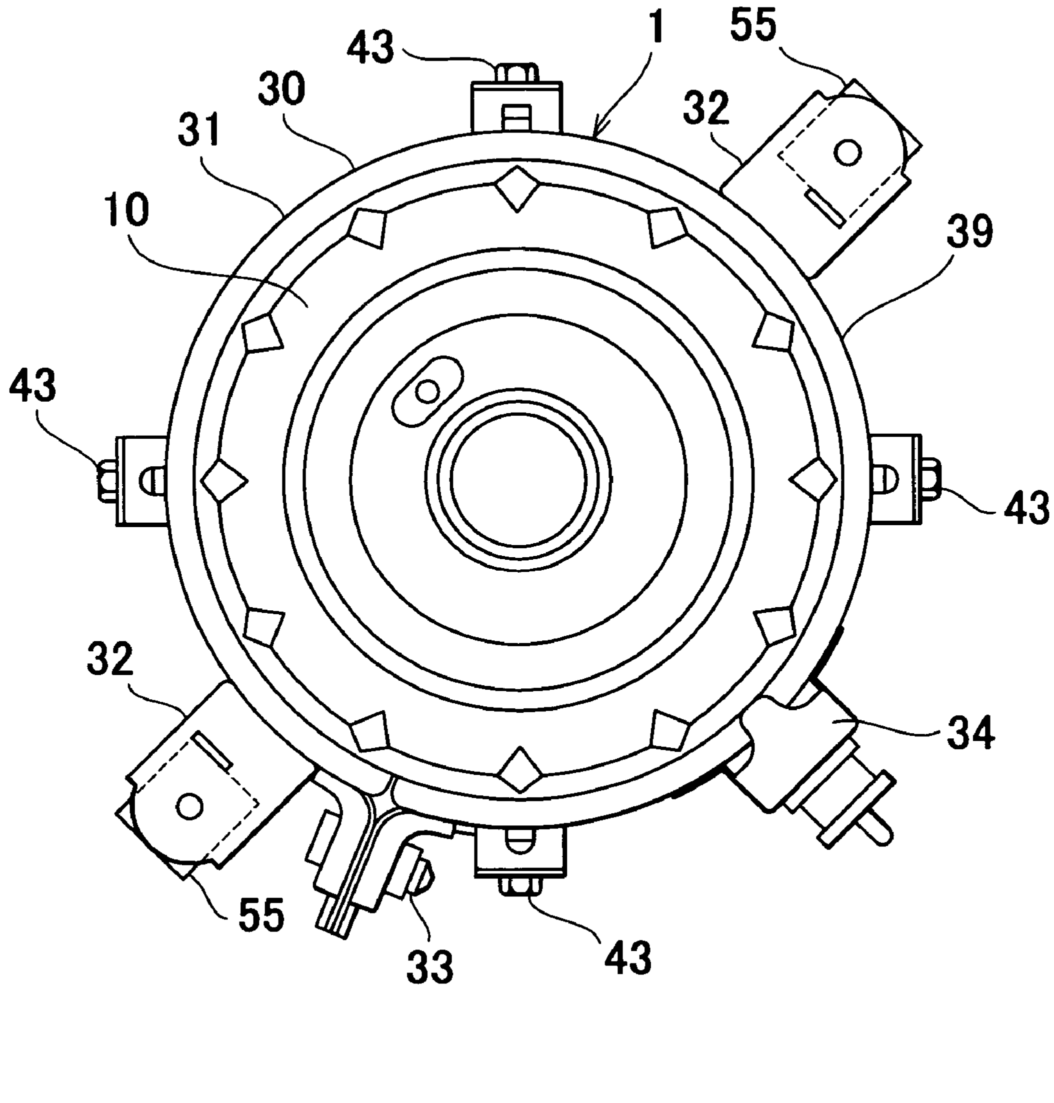
FIG. 4 is a schematic plan view of a tank main body and the mounting structure shown in FIG. 1.

As shown in FIG. 4, the heat accumulation tank 1 is mounted to, and supported by, the receiving member via an elastic member 39 which wraps around the tank main body 10. This elastic member 39 wraps around substantially the entire tank main body 10. The heat accumulation tank mounting member 30 wraps around the outer peripheral surface of the elastic member 39, around substantially the entire periphery of the tank main body 10. Also, by being squeezed in the circumferential direction, the heat accumulation tank mounting member 30 presses the tank main body 10 to the inside in the radial direction via the elastic member 39. In this way, the heat accumulation tank mounting member 30 is mounted to the receiving member while the tank main body 10 is held via the elastic member 39.

The elastic member 39 that wraps around the tank main body 10 is a band-shaped member having elasticity. The material of this member is, for example, rubber. The elastic member 39 may be separate from the heat accumulation tank mounting member 30. Alternatively, the elastic member 39 may be attached to the heat accumulation tank mounting member 30 with an adhesive, or may be vulcanize-bonded to the heat accumulation tank mounting member 30. The example in the drawing shows a case in which the elastic member 39 is separate from the heat accumulation tank mounting member 30. When the elastic member 39 is attached or vulcanize-bonded to the heat accumulation tank mounting member 30, slippage between the elastic member 39 and the heat accumulation tank mounting member 30 is minimized. As a result, the tank holding reliability improves.

Figure 3:
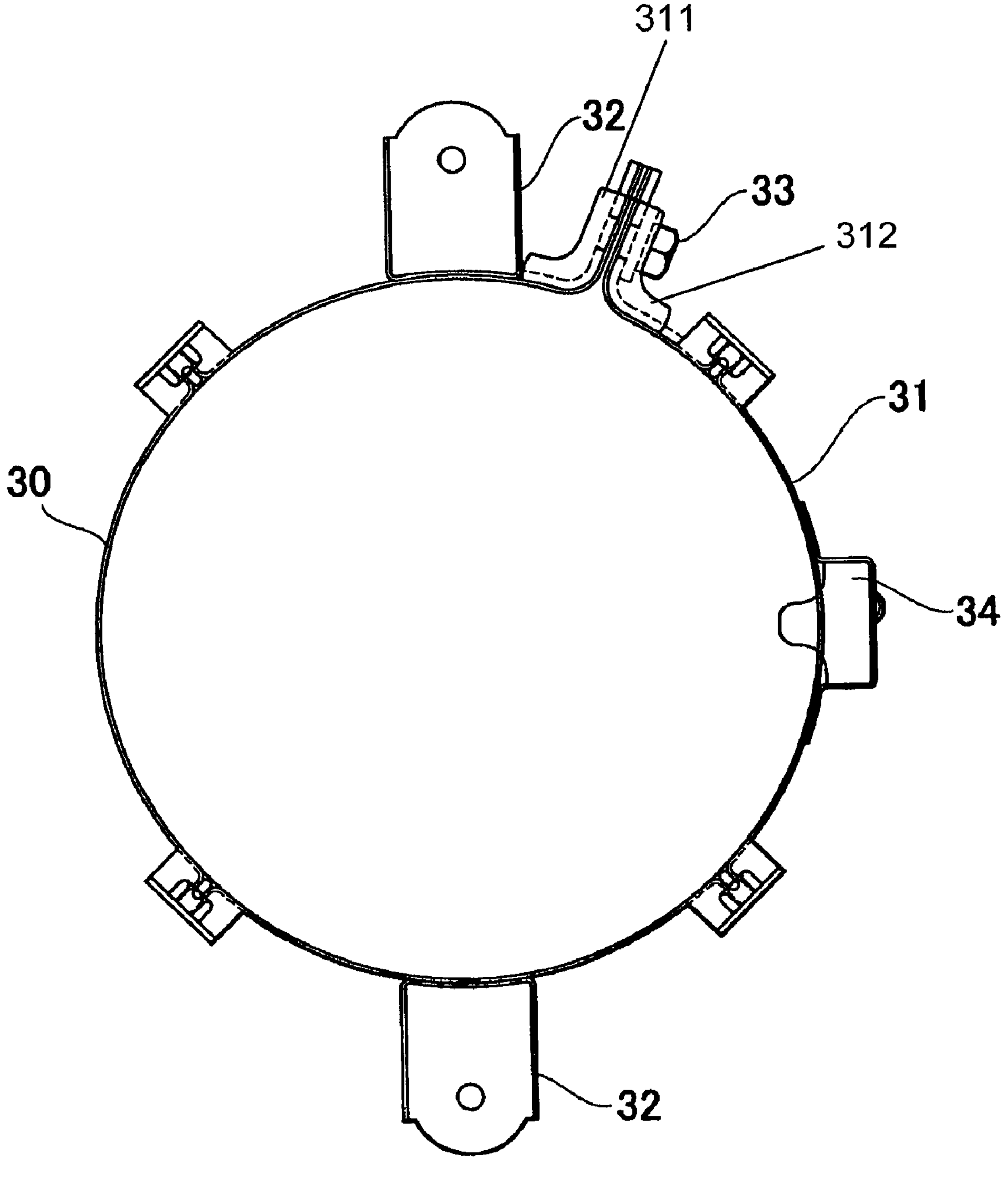
FIG. 3 is a bottom view of the mounting structure shown in FIG. 1.

The heat accumulation tank mounting member 30 has a band (i.e., a band-shaped bracket) 31. The heat accumulation tank mounting member 30 also has a bracket 32. The band 31 extends around substantially the entire periphery of the tank main body 10 in the circumferential direction of the tank main body 10, and is cut in one location on its periphery. Flanges 311 and 312 are formed on both ends of the band, as shown in FIG. 3 for example. The tank main body 10 is pressed inward in the radial direction via the elastic member 39 by tightening a bolt 33 that secures flanges 311 and 312 together.

Figure 2:
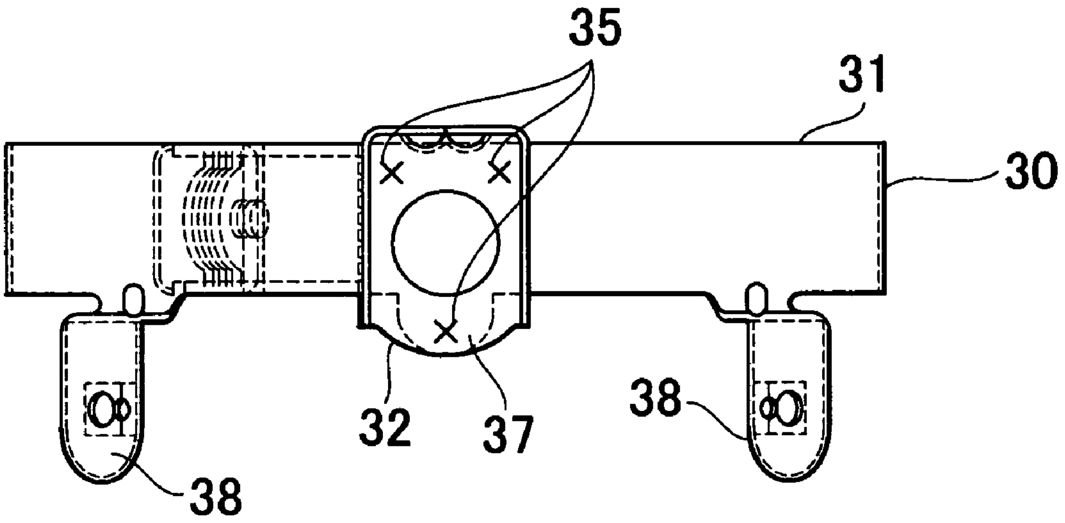
FIG. 2 is a front view of the mounting structure shown in FIG. 1.

Referring to FIG. 2, the bracket 32 is attached to the band 31 by, for example, spot welding (the spot weld zones are denoted by reference numeral 35 in the drawing) in at least one location on the periphery of the band 31. The band 31 is not welded directly to the tank main body 10, but rather holds the tank main body 10 via the elastic member 39. The bracket 32 attached to the band 31 is supported via a rubber bushing 55 on a vehicle side bracket. The tank main body 10 is then mounted to, and supported by, the receiving member by attaching the vehicle side bracket with a bolt or the like to the receiving member.

Referring to FIG. 1, a housing support member 40 includes a upright bracket 41 and bolts 42 and 43. One end of the upright bracket 41 is attached to the band 31 by the bolt 43 at a plurality of locations (e.g., four places) in the circumferential direction of the band. The other end of the upright bracket 41 is fixed to the housing 20 by the bolt 42 or the like. As a result, the housing 20 is held to the tank main body 10 by the upright bracket 41.

Operation of the mounting structure for the heat accumulation tank according to the exemplary embodiment of the invention will now be described.

The heat accumulation tank mounting member 30 covers substantially the entire periphery of the outer tank 12 of the tank main body 10, holding the tank main body 10 around its entire circumference. Accordingly, the tank main body 10 is held with a strong holding force.

Further, because the heat accumulation tank mounting member 30 holds the tank main body 10 via the elastic member 39, the surface pressure on the tank main body 10 is able to be applied evenly. That is, the surface pressure on the tank main body 10 is not greater in one area than another. As a result, distortion of the tank main body 10 and slow leaks, which occur from such distortion, are able to be minimized, making it possible for the tank main body 10 to be held with high reliability.

Also, providing the elastic member 39 provided between the heat accumulation tank mounting member 30 and the tank main body 10 obviates the need for welding the heat accumulation tank mounting member 30 to the tank main body 10. Therefore, the degree of vacuum in the space between the inner tank and outer tank can be maintained without a slow leak, which can occur at the interface of the weld zone, occurring. As a result, the heat accumulation tank 1 can be held reliably over an extended period of time.

One example of the mounting structure for the heat accumulation tank and the operation of that mounting structure is as follows.

The elastic member 39 is preferably a molded part. If the elastic member 39 is made by extrusion molding, the surface becomes too smooth. As a result, the friction coefficient to hold the tank main body 10 is reduced, resulting in a tendency for the tank main body 10 to slip against the elastic member 39 and fall. If the elastic member 39 is a molded part, however, the friction coefficient of the surface of the elastic member 39 can be made high so that the tank main body 10 is less apt to slip against the elastic member 39 and fall. As a result, when the heat accumulation tank mounting member 30 is attached to the outer peripheral surface of the elastic member 39 and tightened, the tank main body 10 can be reliably held by the heat accumulation tank mounting member 30.

The length of the elastic member 39 (i.e., the length in the circumferential direction of the tank main body 10) is made slightly shorter than the length of the circumference of the outer peripheral surface of the outer tank 12 of the tank main body 10. As a result, the end portions of the elastic member 39 do not overlap when the elastic member 39 is wrapped around the outer peripheral surface of the outer tank 12. If the end portions of the elastic member 39 overlap, the holding force that holds the tank main body 10 from the periphery becomes uneven, distorting at the overlapping portions of the end portions of the elastic member 39. As a result, the tank main body 10 may no longer able to be reliably held and the tank main body 10 may deform from being pressed unevenly. If the length of the elastic member 39 is set as described above, however, these problems will not occur.

Figure 5:
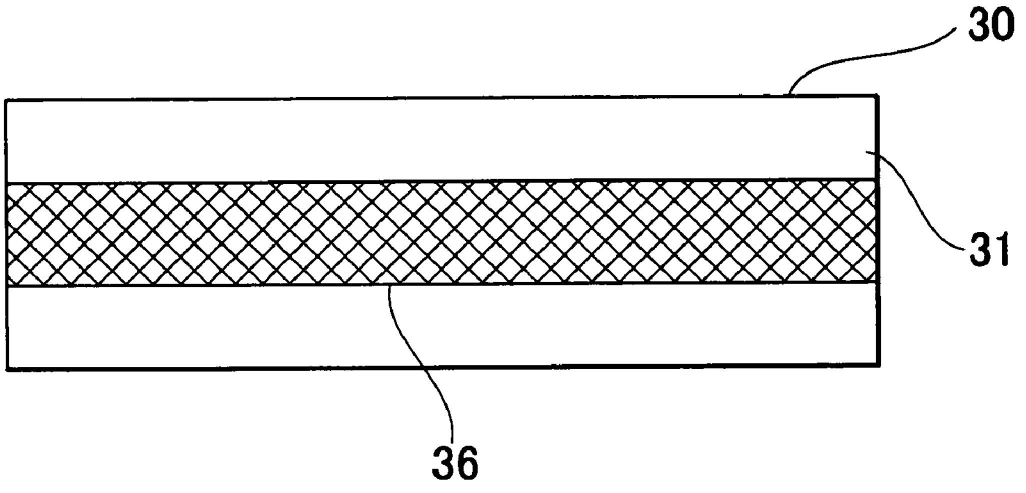
FIG. 5 is a schematic side view of a band shown in FIG. 1.

When attaching the bracket 32 to the band 31 by spot welding, it is desirable that the spot weld zone 35 not be at a portion 36 where major surface pressure is generated (hereinafter also referred to as "major surface pressure receiving portion"). If tightening force acts on the band 31 in the circumferential direction, a large surface pressure will be generated at the middle portion when the band 31 is divided into thirds in the width direction. That is, the major surface pressure receiving portion 36 is the middle potion of the band 31 when the band 31 is divided into thirds internal combustion engine the width direction, as shown in FIG. 5. Irregularities and portions where the friction coefficient is discontinuous, which occur at the spot weld zone 35, are undesirable at that portion 36 because they result in uneven surface pressure over the entire area of the band 31. Therefore, the spot weld zone 35 is preferably positioned on a portion other than the major surface pressure receiving portion 36 of the band 31. That is, the spot weld zone 35 is preferably provided on at least one side portion from among both side portions of the band when the band is divided into thirds in the width direction. According to this structure, it is possible to prevent the surface pressure at the major surface pressure receiving portion 36 from becoming uneven, which enables the heat accumulation tank 1 to be held with greater reliability.

Figure 6:
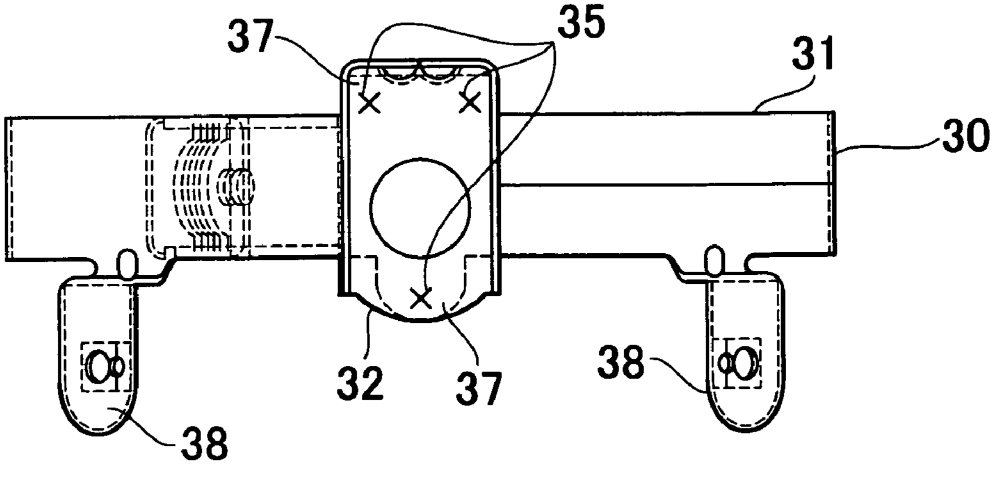
FIG. 6 is a front view of the mounting structure shown in FIG. 1.

If the width of the band 31 is too narrow, thus making it difficult to position the spot weld zones 35 on a portion other than the major surface pressure receiving portion 36, the width of the band 31 at the mounting portion of the bracket 32 may be made wider than the band width at the other portions (this wide portion is denoted by reference number 37 in the drawing), as shown in FIGS. 2 and 6. Providing this wide portion 37 facilitates positioning the spot weld zones 35 on a portion other than the major surface pressure receiving portion 36.

The inner portion of the tank main body 10 is sealed from the outer portion by the seal 19 provided between the tank main body opening 13 and the housing 20. Hydraulic pressure and force in the axial direction due to the weight of the fluid acts on the tank main body 10. If that force is greater than the frictional force of the seal 19, the following occurs. That is, when the holding force that holds the tank main body 10 of the heat accumulation tank mounting member 30 weakens, the tank main body 10 starts to move in the axial direction relative to the housing 20. The force in the axial direction from the hydraulic pressure acts on the tank main body 10 in an upward direction, trying to lift up the tank main body 10 with respect to the housing 20. Further, the force in the axial direction from the weight of the fluid acts on the tank main body 10 in a downward direction, trying to force the tank main body 10 down.

Figure 7:
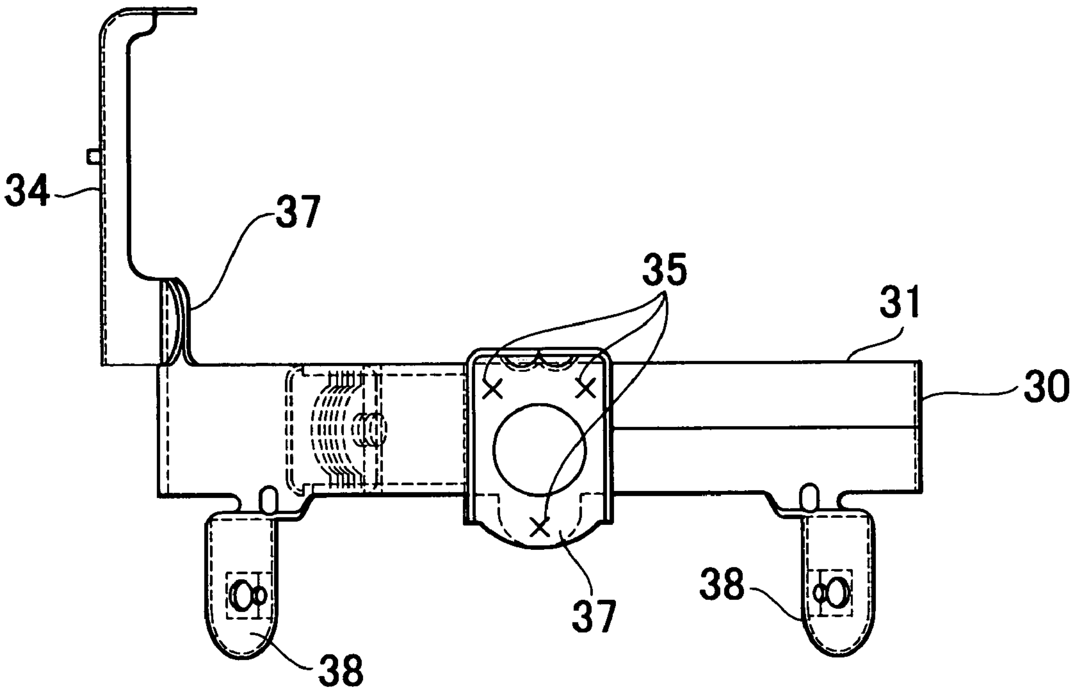
FIG. 7 is a front view of the mounting structure shown in FIG. 6 with a shift inhibiting portion.

In order to minimize this kind of movement of the tank main body 10 with respect to the housing 20, it is desirable to provide a shift inhibiting portion 34 on the heat accumulation tank mounting member 30, as shown in FIG. 7. This shift inhibiting portion 34 inhibits the tank main body 10 from shifting upward with respect to the housing 20.

As shown in FIG. 7, in the structure in which the heat accumulation tank mounting member 30 includes the shift inhibiting portion 34, even when the bracket that forms the shift inhibiting portion 34 is formed separately from the band 31 and attached to the band 31 by spot welding, it is still desirable to position the spot weld zone on a portion other than the major surface pressure receiving portion 36. If the width of the band 31 is too narrow, thus making it difficult to position the spot weld zones 35 on a portion other than the major surface pressure receiving portion 36, the width of the band 31 at the bracket mounting portion that forms the shift inhibiting portion 34 may be made wider than the band width at the other portions (this wide portion is denoted by reference number 37 in the drawing). As a result, it is possible to position the spot weld zones 35 on a portion other than the major surface pressure receiving portion 36 of the band 31.

When the upright bracket 41 of the housing support member 40 is fixed to the band 31 by the bolt 42, it is desirable to provide an extended portion 38 that extends in the axial direction of the tank main body 10 on the band 31 and fix the upright bracket 41 to the band 31 at the extended portion 38. For example, a portion mid-way in the extended portion 38 may be bent away from the tank main body 10 in the radial direction, and the upright bracket 41 may be fixed to the extended portion 38 of the band 31 at the portion away from the tank main body 10, as shown in FIG. 2. In this way, providing the extended portion 38 facilitates positioning the mounting portion of the upright bracket 41 on a portion other than the major surface pressure receiving portion 36 of the band 31.

Even if the bracket which forms the bracket 32 and the shift inhibiting portion 34 is attached to the band 31, providing the extended portion on the band 31 makes it easier to position the bracket mounting portion on a portion other than the major surface pressure receiving portion 36 of the band 31.

Figure 8:
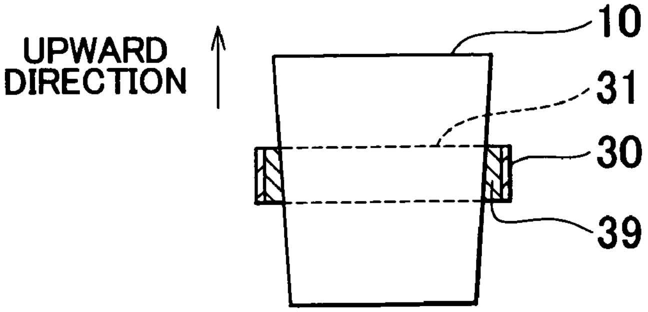
FIG. 8 is a front view of the tank main body in FIG. 1, in which the outer diameter increases in the upward direction, and the mounting structure.

The tank main body 10 has an axial core (which is the same axial core as that of the heat accumulation tank 1). The heat accumulation tank 1 is mounted to the receiving member with the axial core of the tank main body 10 pointing up and down. In this case, it is desirable that the tank main body 10 have a shape in which its the diameter increases in the upward direction, as shown in FIG. 8. With this kind of structure, the tightening load when the tank main body 10 slides down, due to its weight, against the heat accumulation tank mounting member 30 increases by the wedge effect. As a result, it is possible to reliably prevent the tank main body 10 from falling off of the heat accumulation tank mounting member 30.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A mounting structure for a heat accumulation tank, comprising:

a tank main body forming the heat accumulation tank;

an elastic member that wraps around the periphery of the tank main body; and a mounting member which wraps around the outer peripheral surface of the elastic member, which holds the tank main body via the elastic member, wherein the mounting member has:

a band that extends in the circumferential direction of the tank main body, and a bracket that attaches to the band, via spot welding, at a spot weld zone, wherein the spot weld zone is provided on at least one side portion from among both side portions of the band when the band is divided into thirds in the width direction, the spot welding of the bracket at this location serving to prevent uneven surface pressure on the middle third portion of the band in the width direction, which enables the heat accumulation tank to be held with greater reliability, wherein the width direction of the band is perpendicular to the circumferential direction of the tank body, wherein the tank main body has an axial core and the heat accumulation tank is mounted with the axial core of the tank main body pointing in the vertical direction; and the mounting member includes a shift inhibiting portion which inhibits the tank main body from shifting upwards in the vertical direction of the tank main body.

2. The mounting structure according to claim 1, wherein the elastic member is a molded part.

3. The mounting structure according to claim 1, wherein the length of the elastic member in the circumferential direction is shorter than the length of the outer peripheral surface of the tank main body in the circumferential direction.

4. The mounting structure according to claim 1, wherein the band has a wide portion; the shift inhibiting portion is formed from a bracket that is separate from the band, and attached to the wide portion of the band at another spot weld zone.

5. The mounting structure according to claim 1, wherein the tank main body has the axial core, and the heat accumulation tank is mounted with the axial core of the tank main body pointing in the vertical direction; and the tank main body is shaped so as to have an increasingly wider outside diameter upwards in the vertical direction.

6. A mounting structure for a heat accumulation tank, comprising:

a tank main body forming the heat accumulation tank;

an elastic member that wraps around the periphery of the tank main body; and a mounting member which wraps around the outer peripheral surface of the elastic member, which holds the tank main body via the elastic member, wherein the mounting member has:

a band that extends in the circumferential direction of the tank main body, and a bracket that attaches to the band, via spot welding, at a spot weld zone, wherein the spot weld zone is provided on at least one side portion from among both side portions of the band when the band is divided into thirds in the width direction, the spot welding of the bracket at this location serving to prevent uneven surface pressure on the middle third portion of the band in the width direction, which enables the heat accumulation tank to be held with greater reliability, wherein the width direction of the band is perpendicular to the circumferential direction of the tank body, further comprising an extended portion extending in the axial direction of the tank main body on the band; and an upright bracket is fixed to the band at the extended portion.

7. The mounting structure according to claim 6, wherein the elastic member is a molded part.

8. The mounting structure according to claim 6, wherein the length of the elastic member in the circumferential direction is shorter than the length of the outer peripheral surface of the tank main body in the circumferential direction.

9. The mounting structure according to claim 6, wherein the tank main body has an axial core, and the heat accumulation tank is mounted with the axial core of the tank main body pointing in the vertical direction; and the tank main body is shaped so as to have an increasingly wider outside diameter upwards in the vertical direction.

* * * * *

UNITED STATES PATENT AND TRADEMARK OFFICE
CERTIFICATE OF CORRECTION

PATENT NO. : 7,896,308 B2
APPLICATION NO. : 10/811984
DATED : March 1, 2011
INVENTOR(S) : Shigetaka Yoshikawa et al.

It is certified that error appears in the above-identified patent and that said Letters Patent is hereby corrected as shown below:

On the Title Page: Change “(73) Assignee:” from “Toyota Jidosha Kabushiki Kaisha, Toyota-shi (JP)” to --Toyota Jidosha Kabushiki Kaisha, Toyota-shi (JP); Denso Corporation, Kariya-city (JP)--.

| Column | Line | |
|---|---|---|
| 5 | 49 | Change “potion” to --portion--. |
| 5 | 50 | After “thirds” delete “internal combustion”. |
| 5 | 51 | Delete “engine the width direction”. |

Signed and Sealed this
Fourteenth Day of June, 2011

David J. Kappos
*Director of the United States Patent and Trademark Office*